July 15, 1952  E. T. JAYNES  2,603,707
COAXIAL LINE SUPPORT
Filed Dec. 21, 1944  3 Sheets-Sheet 1
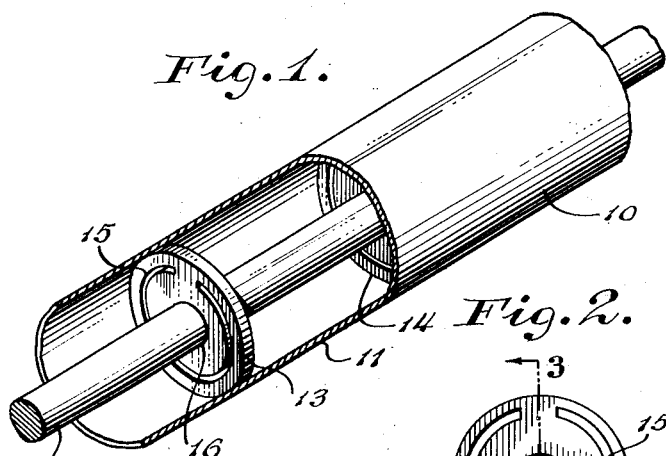
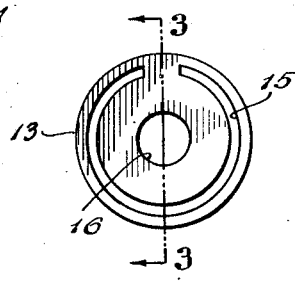 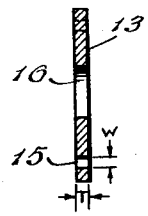
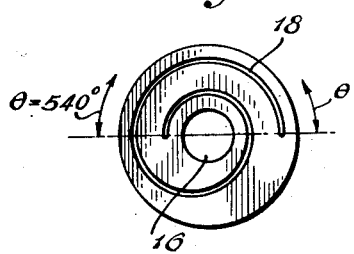 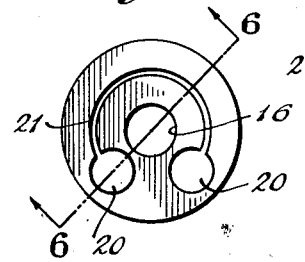 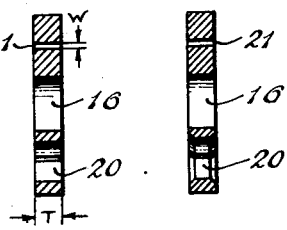
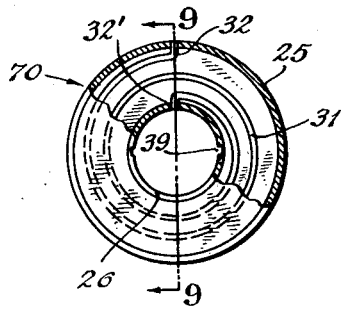 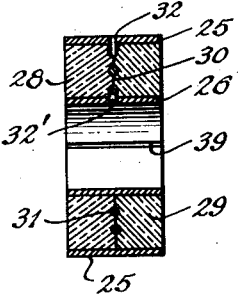
INVENTOR
EDWIN T. JAYNES
BY Paul B. Hunter
ATTORNEY July 15, 1952   E. T. JAYNES   2,603,707
COAXIAL LINE SUPPORT
Filed Dec. 21, 1944   3 Sheets-Sheet 2
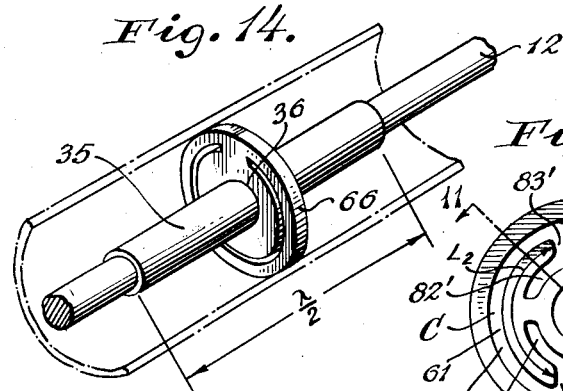
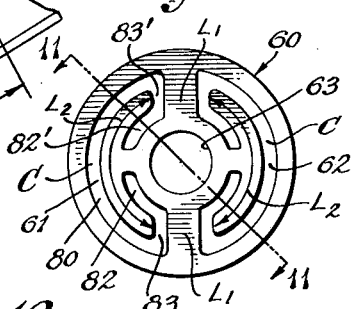
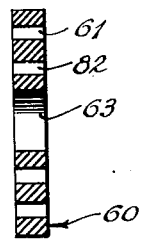
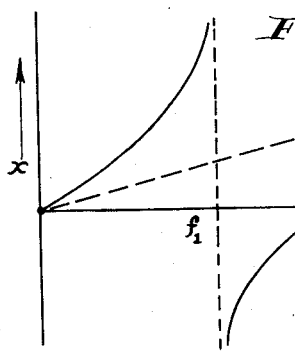
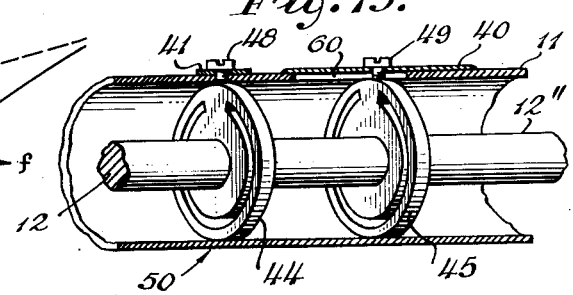
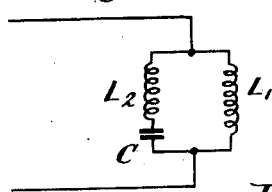
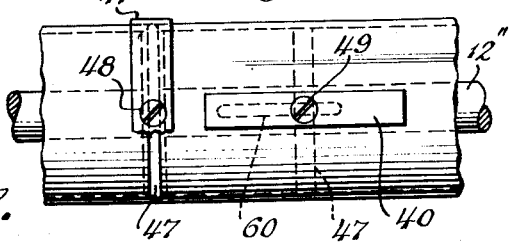
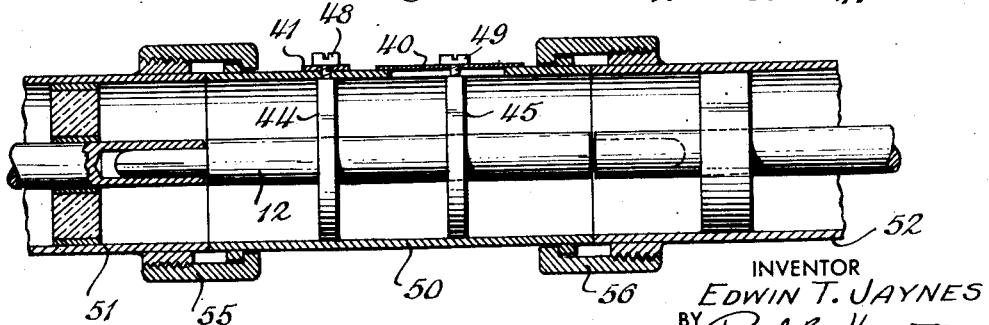
INVENTOR
EDWIN T. JAYNES
BY Paul B. Hunter
ATTORNEY Patented July 15, 1952

2,603,707

UNITED STATES PATENT OFFICE 2,603,707

COAXIAL LINE SUPPORT

Edwin T. Jaynes, Garden City, N. Y., assignor to The Sperry Corporation, a corporation of Delaware Application December 21, 1944, Serial No. 569,239

40 Claims. (Cl. 178—44)

This invention relates generally to apparatus for spacing and supporting concentric conductors used in high frequency systems, and has reference particularly to novel improvements in the type of support used in such concentric conductor transmission lines which operate at ultra-high frequencies. The advantages of the present invention will be more fully evident after a brief discussion of the types of support used in known coaxial or concentric transmission lines.

Concentric transmission lines now in general use have, as their conductor-supporting members, either a form of dielectric bead support appropriately dimensioned and spaced along the transmission line, or a type of quarter-wave metallic stub support having a critical length dependent upon the frequency of the electromagnetic energy transmitted by the line.

Since each type of support possesses certain advantages over the other, the use of either the dielectric bead or the metallic stub is contingent upon the particular purpose that such a support is to serve in the concentric line.

Dielectric beads, conventionally used in concentric transmission lines, introduce electromagnetic energy reflections in these transmission lines, which, although somewhat cancellable in effect by properly pairing, designing and spacing these beads along the transmission line, limit the utility of the transmission line to a narrow frequency band, insufficient for many purposes, in which the amount of electromagnetic reflection by the dielectric beads is small.

On the other hand, stub supports used in high frequency transmission lines usually entail less transmission loss than the dielectric bead but without special provision are still only useful within a narrow frequency band. Stub supports, however, may be placed anywhere mechanically desirable in the transmission line without regard to exact spacing therealong, since a single stub support at its resonant frequency introduces substantially no reflection in the line. If broad band operation is desired, a sleeve, a half wave length long at the center of the operating range of wave lengths, is centered at the stub and put on the inner concentric conductor of the transmission line. The frequency range over which the net reflection is small may be thus increased considerably over that obtainable with paired dielectric beads.

The general situation is that stub supports are preferred electrically but that dielectric bead supports are mechanically much more convenient to use.

No matter which support is used, whether it be the dielectric bead support or the metallic stub support, the function served by either one is the same, being simply that of an efficient support for conductors in a concentric line and desirably causing no undue reflections or losses therein.

The present novel invention comprises a support useful in a concentric high frequency transmission line, and one form further comprises an apertured or slotted conductive disc or bead having a central bore cut therethrough to accommodate the inner conductor of a concentric line. The apertures or slots cut in the conductive disc or bead are usually resonant at the frequency of electromagnetic energy being transmitted by the transmission line. By suitably patterning or designing these resonant slots or apertures, the conductive disc or bead can be made to behave like a parallel resonant circuit at any desired frequency. These beads or discs are therefore suitably designated as "resonant" beads.

The present novel invention of a "resonant" bead is greatly superior as a supporting structure in a concentric transmission line to either a stub support or a dielectric bead support, combining, as it does, the mechanical advantages of the dielectric bead support with the electrical advantages of the metallic stub support. It has also advanced far beyond the prior, orthodox concept of a support, per se, and has added to the novel support structure a further highly important concurrent use as a species of two or four-terminal dissipationless electrical network having various frequency response characteristics when used in a concentric transmission line.

Further, the novel beads of the present invention are as easy to manufacture, assemble and handle as ordinary dielectric beads, and they are far simpler to produce or assemble than stub supports, yet electrically they function as well, in most respects, as stub supports. In fact, in many instances, the resonant bead is superior in band width to stub supports of the same characteristic impedance as the line. Moreover, these beads may be designed to achieve electrical characteristics unobtainable through the use of the ordinary stub support. Furthermore, they are much more easy to adjust and align then stub supports.

Physically, these beads are even more desirable to use than dielectric beads since they are more resistant to mechanical shock and high temperatures, and do not limit the length of the transmission line in which they are used, as is sometimes the case with dielectric bead supports because of the transmission line losses concurrent with their use. Electrically, these novel resonant beads have a band width tolerance, over which there is very little reflection at the operating frequency to which they are resonant, many times that of the dielectric bead and are thus far superior to the ordinary dielectric bead.

Accordingly, it is an object of this invention to provide a novel type support for coaxial transmission lines which combines the mechanical features of a dielectric bead with the electrical characteristics of a stub support.

Another object of this invention is to provide a novel support for coaxial lines having electrical properties simulating those of a variety of two-terminal dissipationless networks having various frequency response characteristics.

A further object is to provide a novel type support for coaxial transmission lines at ultra high frequencies which shall be such that a minimum of electrical reflection effects occur therein.

Another object of this invention is to provide an improved circuit arrangement of concentric conductors in combination with spacing and supporting members of this invention.

Still another object is to provide a novel type support employed in coaxial lines for improved transmission of waves in an extremely wide band of frequencies extending to the order of many megacycles per second.

Yet another object is to provide an improved support between the inner and outer conductors of a coaxial line resulting in an improved coaxial conductor system for ultra high frequency transmission.

Another object of this invention is to provide a novel type of coaxial line support having a concurrent use as a variety of two or four-terminal dissipationless electrical networks having various frequency response characteristics.

Still another object of this invention is to provide a novel type of variable impedance network.

A further object of this invention is to provide a novel type of filter for use in a concentric high frequency transmission line.

A further object of the invention is to provide improved apparatus and instrumentalities embodying novel features and principles, adapted for use in realizing the above objects and also adapted for use in other fields.

Other objects and advantages will become apparent from the specification taken in connection with the accompanying drawings wherein the invention is embodied in concrete form.

Fig. 1 shows a perspective, partly cut-out view of a concentric high frequency transmission line utilizing the novel resonant bead invention therein;

Fig. 2 shows a detail elevational view of one of the novel resonant beads used in the device represented in Fig. 1;

Fig. 3 shows a section of Fig. 2 taken along line 3—3 thereof;

Fig. 4 shows a detail elevation view similar to Fig. 2 but representing a modification of the structure thereof;

Fig. 5 shows an elevational view of still another modification of the bead detailed in Fig. 2;

Fig. 6 shows a cross-sectional view of Fig. 5 taken along line 6—6 thereof;

Fig. 7 shows a cross-sectional view similar to Fig. 6 of a slightly modified form of bead;

Fig. 8 shows a detailed elevational view with portion in section of another form of the resonant bead which may be used in lower frequency transmission lines;

Fig. 9 shows a sectional view of the bead represented in Fig. 8 taken along line 9—9 thereof;

Fig. 10 shows a detail elevational view of a novel resonant bead support additionally useful as a filter;

Fig. 11 shows a sectional view of Fig. 10 taken along the line 11—11 thereof;

Fig. 12 shows a graph useful in explaining the action of the filter-type resonant bead of Figs. 10 and 11;

Fig. 13 shows a circuit diagram useful in explaining the operation of the filter-type bead of Figs. 10 and 11;

Fig. 14 shows a perspective view of a resonant bead used in connection with a half-wave length sleeve placed along an inner conductor of a concentric transmission line for improving band width;

Fig. 15 shows a perspective view partly in cross section of a variable impedance network;

Fig. 16 shows a plan view of the device shown in Fig. 15;

Fig. 17 shows a cross-sectional view of the device shown in Figs. 15 and 16 inserted in an ordinary concentric transmission line and being coupled therewith;

Figure 18:
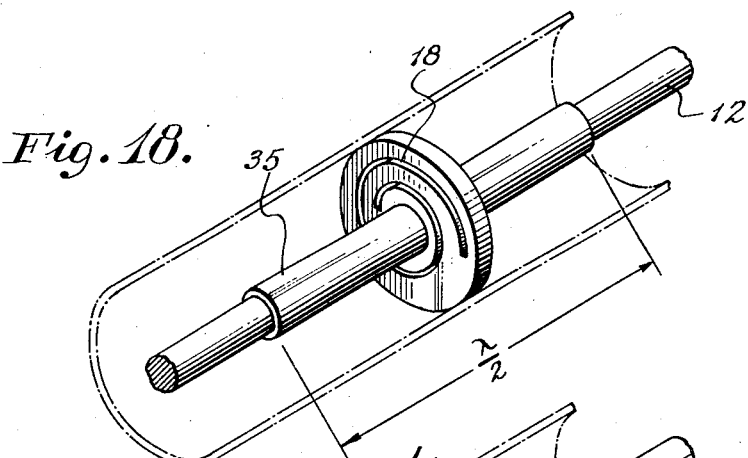
Fig. 18 shows a perspective view of the resonant bead shown in Fig. 4 used in connection with a half-wavelength sleeve placed along an inner conductor of a concentric transmission line for improving band width.

Referring first to Figs. 1–9, various types of resonant bead supports for inner concentric conductors of coaxial lines are shown which are mechanically like dielectric beads, but have the electrical characteristics of stub supports. Each type of resonant bead consists of a relatively thin metal or conductively coated substantially cylindrical disc, having its radial dimensions the same as for an ordinary dielectric bead used in similarly dimensioned coaxial lines. A thickness of $\frac{1}{8}$ inch has been found to be useful.

An appropriate pattern is cut through the disc so that it behaves electrically like a parallel resonant circuit at the frequency for which the line is to be used. The exact dimensions of the type of pattern to be used can be approximated from a few general principles explained below.

The electrical behavior of any parallel resonant circuit is normally described in terms of the three parameters: resistance R, inductance L, and capacitance C, but for the purpose at hand it is more convenient to use three derived parametric terms: characteristic impedance Z, resonant frequency $f_0$ and Q.

As is well known, $$Z = \sqrt{\frac{L}{C}}$$

$$f_0 = \frac{1}{2\pi\sqrt{LC}} = \frac{c}{\lambda_0} \qquad (1)$$

(where $c$ is the velocity of propagation and $\lambda_0$ is the wavelength at resonance)

$$Q = \frac{1}{R}\sqrt{\frac{L}{C}}$$

The quantity Z will be referred to as the characteristic impedance of the parallel resonant circuit. At a frequency $f$, the admittance of the circuit may be expressed as:

$$Y = \frac{1}{ZQ}\left[1 + Q^2\left(\frac{f}{f_0} - \frac{f_0}{f}\right)^2\right]^{\frac{1}{2}} e^{j\phi} \quad (2)$$

$$\tan \phi = Q\left(\frac{f}{f_0} - \frac{f_0}{f}\right)$$

If $Q \gg 1$, this is approximately equal to:

$$Y = j\frac{1}{Z}\left(\frac{f}{f_0} - \frac{f_0}{f}\right) \quad (3)$$

The above approximation is justified because all beads of this type have a Q so high that the impedance at resonance is extremely high compared with the characteristic impedance of the line in which the bead is used. The actual behavior of the circuit departs from Equation 3 only in the immediate vicinity of resonance where its impedance is so high that the bead introduces negligible reflection anyway.

The electrical properties of the bead, that are of greatest practical interest, are accordingly the resonant frequency $f_0$ or wave length $\lambda_0$ and the characteristic impedance Z which determines the useful reflection band width over which the admittance of the bead is small compared with the characteristic admittance of the line, and therefore over which the bead may be used without special techniques for broad-banding.

It is convenient to consider the resonant bead as a lumped parallel resonant circuit because of the simplicity of that circuit and the fact that the dimensions of the bead are small compared to a wave length. Of course, as will be seen, the inductance and capacitance of the bead are really distributed, and so the admittance of the bead must deviate from (2) at higher frequencies where, from Foster's Reactance Theorem, there must be alternate zeros and infinites of the reactance as the wave length becomes progressively shorter.

In Fig. 1 there is shown a concentric line 10, having a hollow outer conductor 11 and an inner conductor 12 substantially concentrically disposed within the outer conductor 11, and supported by resonant beads 13 and 14 forming part of the present invention. These beads are shown more in detail in Figs. 2 and 3. Beads 13 and 14 have a circularly shaped slot 15 disposed about a central bore 16 of the resonant bead which accommodates the inner conductor 12.

It is also possible to consider the bead as a two-wire transmission line distorted in shape, or a short section of wave guide rolled up so as to be excited by the main mode in the coaxial line.

Either of these points of view enables us to anticipate that for the type of pattern indicated in the resonant beads shown in Fig. 2, the bead will be resonant at a wave length roughly equivalent to twice the total length of the slot. However, it is found experimentally that in the neighborhood of 3,000 megacycles per second the resonant wave length is about 8% shorter than the above estimate for a ⅜″ radius of the circular slot 15.

For a slot of uniform width, the resonant wavelength $\lambda_0$ is proportional to the length, and Z increases with increasing W and decreases with increasing T, where W is the width of the slot in a radial direction, and T the thickness of the bead. It is thus seen that the band width of the bead can be increased at the expense of its mechanical strength by using a radially wider slot, or a thinner bead.

The thickness T of the resonant beads 13 and 14, is, as stated above, effective in broadening the frequency response of the bead used in the concentric line. For example, for use in a one inch coaxial line, a bead ⅛″ thick has been found to be satisfactory, with the other dimensions of the bead remaining the same as those commonly used for dielectric beads in similarly dimensioned concentric lines. If, however, a bead 1/16″ is used, the band of frequencies which may be passed down the coaxial line without disturbing reflections is broadened.

The radius of the circular slot 15 has substantially no effect on the resonant frequency. For this reason, any convenient radius may be used; in fact, if desired, one wall of the slot may be formed by the inner surface of outer conductor 11 cooperating with a decreased radius portion of the supporting bead 13 having an arcuate length corresponding to the desired resonant wavelength.

Beads 13 and 14 have arcuately shaped slots 15 disposed about a bore 16 snugly fitting the inner conductor 12. The width W of the slots cut in the resonant beads 13 and 14 has also, as priorly stated, a decided effect on the band width of the frequencies passed by the bead without disturbing reflections. Generally speaking, the wider the slot used, the greater the band width.

Although Figs. 1–3 show a single slot 15 disposed about a bore 16, the present invention is not limited as to the number of slots disposed above the bore, since a plurality of arcuately or other shaped slots can be used when desired. Further, any number of symmetrical slots may be cut in a bead or conductive support.

As stated, the wavelength at which the beads are best adapted to be used is approximately twice that of the length of the slot disposed about the central bore. Thus, it has been found that at certain frequencies requiring a longer slot, a substantially spiral slot 18 having a subtended angle ($\theta = 540°$) as shown in Fig. 4, is mechanically expedient and practicable.

In Figs. 5 and 6, a slot pattern which comes nearer to giving a true lumped parallel circuit is shown. This is known as the "dumb-bell" type resonant bead. Here the inductance and capacitance are more nearly localized in regions 20 and 21 respectively.

The inductance of the holes 20 is estimated from the following considerations: By inductance is meant the ratio of the total magnetic flux linking a circuit to the current in the circuit producing that flux. If there is a current of I amperes flowing along the inside edge of a hole of area A square meters in a plate thickness T meters the surface current density is I/T amperes per meter, which is equal to the magnetic field intensity H at the surface of the metal. The flux density near the inside surface of the hole will then be $$\mu H = \frac{\mu I}{T}$$

Inside a small hole the magnetic field will be nearly uniform, and so the total flux through the hole is $$\frac{\mu I A}{T}$$

The inductance of the hole 20 is therefore approximately:

$$L = \frac{\mu A}{T}$$

henries. In air $\mu = \mu_0 = 4 \times 10^{-7}$. Using this value and changing to more practical units, we have:

$$L(m\mu h) = 13\frac{A(\text{cm.}^2)}{T(\text{cm.})} = 32\frac{A(\text{in.}^2)}{T(\text{in.})} \quad (6)$$

This formula neglects currents flowing on the plane surface around the hole 20, and assumes a uniform current density along the cylindrical inside surface of the hole. It therefore gives an upper limit to the inductance, and values calculated by it might be expected to be too high. In this case, however, there is another factor which tends to increase the circuit inductance, namely the fact that two holes are used, and that they are rather close together. Their mutual inductance has thus not been taken into account. Because these two sources of error are of opposite sign, Formula 6 is deemed quite accurate.

Since the thickness T of the bead appears in the denominator, it can be seen that the inductance of the hole can be increased by countersinking as shown in Fig. 7, since the inside surface current is concentrated into a smaller area. This increases the series resistance of the hole, but since the inductance follows (6) the Q remains constant.

The capacitance across the slot 21 can be estimated from the formula:

$$C(\mu\mu f) = .88\frac{LT}{W}(\text{cm.}) = 0.22\frac{LT}{W}(\text{in.}) \quad (7)$$

where L is the length of the slot, T the thickness of the bead, and W the width of the slot.

A somewhat different and more complex problem is confronted when designing beads operative at longer wavelengths, say those approximating 40 centimeters. It is then not feasible to use the constructions described above, since the length of the required cut-out pattern is far larger than the space available in the bead.

For example, there would not be sufficient room for the resonant slot which must be approximately 6 inches long at this wavelength. However, the present invention provides a bead which is mechanically like a dielectric bead, but electrically acts like a stub support at such low frequencies as shown in Figs. 8 and 9.

In Figs. 8 and 9, resonant bead 70 consists of two coaxial conducting sleeves 25 and 26, separated by two axially arranged dielectric rings 28 and 29. Between the rings 28, 29 is a small protected space 30 in which several turns of wire 31 are wound, one end of the wire 31 being connected to sleeve 25 at a point 32, and the other end to sleeve 26 at point 32'.

The capacitance of the parallel resonant circuit is then that established mainly between the sleeves 25 and 26 through the dielectric 28 and 29, and the inductance is localized in the form of the substantially spiral wound coil 31.

It has been found that, at 40 centimeters, using this construction, it is feasible to make $$\sqrt{\frac{L}{C}}$$

of the bead considerably higher than the characteristic impedance of the ordinary coaxial line, which may be of the order of 50 ohms. The reason for this is that the metal of the inductance is not used to derive mechanical support and therefore, the diameter of the wire can be made small and a large number of turns used, leading to a high inductance. Axially extending grooves 39, distributed around the outside edge of this bead 70, are utilized to allow the free flow of air through the line, or in some cases to allow condensed moisture to run out.

A far wider choice of possible patterns for metal beads than those which lead to a simple parallel resonant effect can be had by cutting more complicated patterns in the conductive beads. The beads are then made to simulate a variety of two-terminal or four-terminal dissipationless networks.

Suppose it is desired to design a filter-type bead or support which will pass waves of one frequency without attenuation, and will totally reflect waves of some other high frequency. A bead as in Figs. 10 and 11 may be used.

Figs. 10 and 11 illustrate a resonant bead 60 having a central bore 63 for supporting the inner conductor 12, and having a family of slots, 61, 62 disposed about the central bore 63 to give various frequency response characteristics. Slot 61 is a labyrinthine slot formed of a plurality of connected sections. A central section 80 is arcuately shaped and has end sections 82, 82' substantially parallel thereto and concentrically formed therewith. The end sections 82, 82' are connected to central section 80 by means of transverse sections 83, 83'. Slot 61 thus has the shape of the upper case letter C. Slot 62 is a mirror image of slot 61 having the same shape and dimensions as slot 61.

Bead 60 is deemed to have a capacitance C, which is a property of slots 61 and 62. In series with capacitance C of bead 60 is an inductance $L_2$, which is deemed to reside in the peninsulas of metal bounded by slots 61 and 62. The inductance $L_1$ of the parallel branch of the resonant circuit is deemed to reside in the remaining structure of the bead. Inductance $L_2$ is in series with capacitance C to form the branch ($L_2$,C) of the parallel resonant circuit ($L_2$,C : $L_1$). Of course, any number of patterns can be designed and cut into the bead so as to alter the response characteristics.

To illustrate the action of the bead 60, a simple circuit, showing one type of equivalent electrical characteristic which may be provided for the bead 60 shown in Fig. 10, is drawn in Fig. 13. Fig. 12, in addition, is a graph showing shunt reactance of the bead 60 as a function of its frequency.

Near the frequency $f_1$ the resonant bead 60 behaves like a parallel resonant circuit. At this frequency branch ($L_2$,C) act like a large capacity in parallel with the parallel branch of the circuit, $L_1$.

The resonant frequency of the branch $L_2C$ is $f_2$, and at this frequency the bead acts as a short circuit across the line, reflecting all the energy. The following relations are found to apply to the equivalent circuit:

$$f_2 = \frac{1}{2\pi\sqrt{L_2 C}}$$

$$\frac{f_2}{f_1} = \sqrt{1 + \frac{L_1}{L_2}} \quad (8)$$

In a practical case one might want $f_1$ and $f_2$ to be 30 mc. apart at about 3000 mc. For this case it is found from (8) that $L_2 = 50 L_1$.

Near the frequency $f_1$ the bead behaves like a parallel resonant circuit with characteristic impedance.

$$Z=\sqrt{\frac{L_1}{C}}\left(\frac{L_1}{L_2}\right)^{3/4} \quad (9)$$

If $L_2=50L_1$, this reduces to:

$$Z=.00283\sqrt{\frac{L_1}{C}}$$

The resonant bead 60 as shown in Fig. 10 can also be used at a frequency too low for a parallel resonant circuit of the type of Figs. 1–9 to be inserted into available space in a concentric line for a given strength of construction, since the series branch (C,$L_2$) acts, as described above, like a large capacity and is thus resonant at lower frequencies.

Fig. 14 shows a resonant bead 66 used with a half-wavelength sleeve for broad-banding purposes. It will be understood that the bead or support 66 may be of any of the types discussed in this specification.

First, as with ordinary dielectric beads, if reflections occur, resonant beads can be properly spaced so as to cancel out these reflections. These reflections may be cancelled by spacing the beads $$\frac{\lambda}{4}$$

distance apart.

However, when an extremely wide band width is required, a half-wave sleeve 35 is placed over the inner conductor 12 with the center of the sleeve 36 placed at the bead 66. The resulting band width is made extremely large by this method. For instance, a wavelength range of 8–12 centimeters can be satisfactorily covered by a single support of this kind, without creating excessive disturbing reflections.

Fig. 18 shows a resonant bead having a spiral slot 18 as shown in Fig. 4 used with half-wavelength sleeve 35 for broad banding purposes. This sleeve, of course, operates in the same manner as the sleeve shown in Fig. 14.

Figure 19:
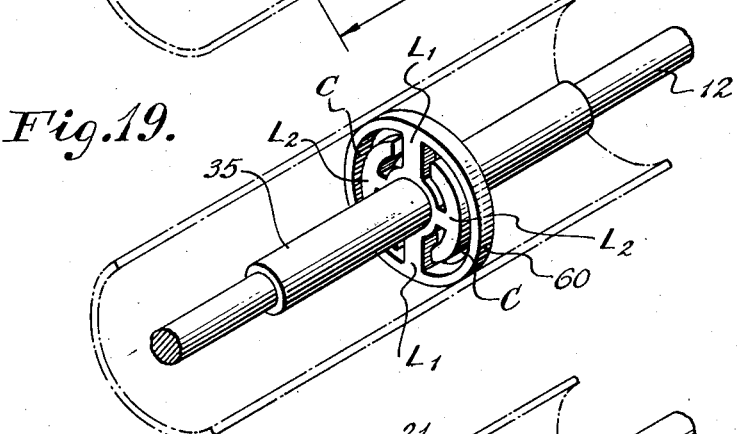
Fig. 19 shows a perspective view of the resonant bead shown in Fig. 10 used in connection with a half-wavelength sleeve placed along an inner conductor of a concentric transmission line.
Figure 20:
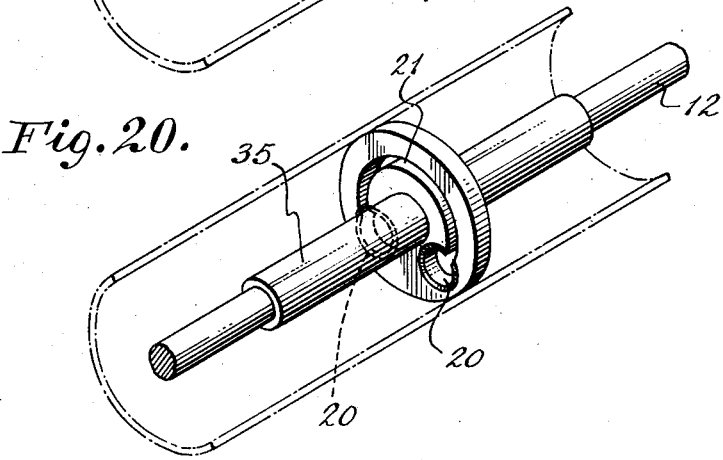
Fig. 20 shows a perspective view of the resonant bead shown in Fig. 7 used in connection with a half-wavelength sleeve placed along an inner conductor of a concentric transmission line.

Fig. 19 shows resonant bead 60 used with half-wavelength sleeve 35 and Fig. 20 shows resonant bead illustrated in Fig. 7 used with half-wavelength sleeve 35. As in the modification in Fig. 14 this sleeve is utilized for broad-banding purposes.

Figs. 15, 16 and 17 illustrate the use of these resonant beads in constructing variable impedance networks, filters, impedance transformers and other types of two and four-terminal dissipationless electrical networks.

In Figs. 15 and 16, there is shown a variable reactance network section of transmission line 50 having an outer conductor 11, an inner conductor 12 supported within the outer conductor by resonant beads 44 and 45. These beads may be of any of the above types. Beads 44 and 45 need not have the same resonant frequency characteristics. Resonant bead 44 is rotatably adjustable about the inner conductor 12 by means of slot 47 and set-screw 48. The resonant bead 45 is axially longitudinally adjustable along inner conductor 12 by means of slot 60 and set-screw 49. Plate 40 is placed on the outer conductor 11 in order to avoid leakage of electromagnetic energy to the outside when adjusting bead 45 along the coaxial inner conductor 12. Plate 41 is similarly used with bead 44 to prevent leakage when rotating bead 44 about the inner conductor 12.

The action of Fig. 16 will be understandable from the following: In an ordinary coaxial transmission line electromagnetic energy is propagated along the coaxial line only in its principal mode because the line has been so dimensioned as to prevent higher order modes from being propagated along the line.

Whenever there is a discontinuity or reflecting element introduced into a concentric line, such as by inserting a supporting bead or quarter-wave stub in the line, a portion of the incident principal wave is reflected back toward the generator and in addition, high order modes are excited in the line. Because the usual concentric transmission line propagates only the principal mode, since the line has been restricted in size, energy of the higher order modes decays exponentially along the line and does not reach a succeeding bead or discontinuity spaced down the transmission line.

In the present invention, resonant beads 44 and 45 are placed sufficiently close together so that the higher order fields set up by the individual beads interact with one another. That is, the field configuration set up by each bead will be affected by the presence of the other and the impedance function of the combination of beads will, therefore, depend on the interaction of the higher order fields between them.

The interaction between the beads can be altered by varying the spacing between the beads, or by rotating one bead with respect to the other, since the electromagnetic field configurations near the beads are thus altered.

The impedance function of the bead combination 44 and 45 is, therefore, altered by rotating bead 44 with respect to bead 45, thus modifying the admittance introduced by the individual beads, and the impedance function may be further altered by changing the spacing between beads.

Thus, by altering the axial position of resonant bead 45 with respect to bead 44, and radially rotating bead 44 with respect to bead 45, concentric line section 50 acts as four-terminal impedance network which is variable as desired. Such a network may be used as a variable filter, a variable impedance transformer, etc.

Fig. 17 illustrates yet another application of the resonant bead combination. Fig. 17 shows a section of coaxial line 50 joined and coupled to coaxial line sections 51 and 52. Section 50 is formed as shown in Figs. 15 and 16 and acts as a variable impedance section between sections 51 and 52. Coaxial line sections 51 and 52 are sections of ordinary coaxial line which are coupled to section 50 by locking joints 55 and 56. Section 50 comprises beads 44 and 45, which are adjustable as shown in Fig. 16. Section 50 thus acts as a variable impedance network between sections 51 and 52.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high frequency apparatus comprising an outer conductor, an inner conductor disposed within said outer conductor, and conductive means between said conductors for supporting said inner conductor within said outer conductor, said means having a bore accommodating said inner conductor and a curved resonant slot disposed about said bore and extending through said conductive means.

2. A high frequency apparatus comprising an outer conductor, an inner conductor disposed within said outer conductor, and a conductive support arranged between said conductors and supporting said inner conductor within said outer conductor, said conductive support having a central bore accommodating said inner conductor and an elongated resonant slot extending through said support between said conductors.

3. Apparatus for transmitting high frequency electromagnetic energy comprising an outer conductor, an inner conductor disposed within said outer conductor, and conductive disc means supporting said inner conductor within said outer conductor, said conductive disc means being contained entirely within said outer conductor and having an aperture, said conductive disc means further being resonant to a predetermined frequency of electromagnetic energy transmitted through said aperture.

4. A high frequency apparatus comprising an outer conductor, an inner conductor disposed within said outer conductor, and a substantially cylindrical resonant support arranged between said conductors and supporting said inner conductor within said outer conductor, said support having a central bore and an elongated curved slot cut therethrough, said slot being disposed about said bore and having a length corresponding to the resonant wavelength.

5. A high frequency apparatus comprising an outer conductor, an inner conductor disposed within said outer conductor, a plurality of resonant conductive bead supports arranged between said conductors and supporting said inner conductor within said outer conductor, each of said supports having a central bore and an elongated curved slot cut therethrough, said slot being disposed about said bore and of a length corresponding to the resonant wavelength of said support.

6. A high frequency apparatus comprising an outer conductor, an inner conductor disposed within said outer conductor, a conductive resonant support arranged between said conductors and supporting said inner conductor within said outer conductor, said conductive support having a central bore accommodating said inner conductor and also having a slot disposed about said bore, said slot having a length corresponding to the resonant wavelength.

7. A conductive resonant support having a diameter substantially equal to the bore of an outer conductor of a transmission line and a centrally located aperture for the inner conductor of said line, said disc having a spiral slot disposed about said aperture.

8. The structure as defined in claim 7 in which the slot has a length corresponding to the resonant wavelength.

9. A high frequency apparatus comprising an outer conductor, an inner conductor disposed within said outer conductor, and a conductive resonant support arranged between said conductors and supporting said inner conductor within said outer conductor, said conductive support having a narrow slot with expanded termini, the capacitance and inductance of said resonant support being localized in said slot and said termini respectively.

10. A high frequency apparatus comprising an outer conductor, an inner conductor disposed within said outer conductor, a conductive resonant support arranged between said conductors and supporting said inner conductor within said outer conductor, said conductive support having an arcuately shaped narrow slot with expanded counter-sunk termini, said counter-sinking being effective for increasing the inductance of said support.

11. A high frequency apparatus comprising an outer conductor, an inner conductor disposed therewithin, and conductive means arranged between said conductors supporting said inner conductor within said outer conductor, said conductive means having a central bore accommodating said inner conductor therethrough and having a plurality of symmetrical slots disposed thereabout, said slots being so formed as to render the same resonant at a predetermined frequency.

12. A high frequency apparatus comprising an outer conductor, an inner conductor arranged within said outer conductor, and a resonant support conductively connected between said conductors supporting said inner conductor within said outer conductor, said support being substantially cylindrical in shape and having a central bore substantially surrounded by a concentric circular slot, said slot extending through said support.

13. A high frequency apparatus comprising a hollow outer conductor, an inner conductor concentrically arranged within said outer conductor, and a conductive support disposed between said conductors within said outer conductor, said conductive support having a central bore and a slot having a length approximately one-half as long as the wavelength of the electromagnetic energy being transmitted at the operating frequency.

14. A high frequency apparatus comprising a hollow outer conductor, an inner conductor arranged within said outer conductor, and a conductive supporting member disposed between said conductors and supporting said inner conductor within said outer conductor, said supporting member having a central bore supporting said inner conductor and a plurality of resonant slots formed therein, said slots being resonant to a predetermined wavelength.

15. In a high frequency transmission line comprising a hollow outer conductor and an inner conductor concentrically disposed therein, the combination comprising a conductive disc supporting said inner conductor within said outer conductor, said disc having a central bore accommodating said inner conductor therethrough and also having a single slot substantially encircling said bore, said disc having an axial thickness along said transmission line proportional to the width of the frequency range of the electromagnetic energy desired to be passed along said transmission line.

16. A high frequency transmission line comprising a hollow outer conductor, an inner conductor concentrically disposed therein, a conductive disc supporting said inner conductor within said outer conductor, said disc having a central bore accommodating said inner conductor passing therethrough, and also having a single slot substantially encircling said bore.

17. A high frequency transmission line comprising a hollow outer conductor, an inner conductor concentrically disposed therein, a conductive disc supporting said inner conductor within said outer conductor, said disc having a central bore accommodating said inner conductor passing therethrough, an individual slot substantially encircling said bore having a longitudinal length commensurate with the operating frequency of the transmission line.

18. Apparatus for transmitting high frequency electromagnetic energy comprising an outer conductor, an inner conductor disposed within said outer conductor, a hollow conductive sleeve member telescopically supported by said inner conductor, said sleeve for minimizing spurious reflections of electromagnetic energy and conductive disc means supporting said inner conductor within said outer conductor, said conductive disc means positioned at the center of said hollow conductor sleeve and being entirely enclosed within said outer conductor, and having a resonant slot therein.

19. Apparatus for transmitting high frequency energy comprising an outer conductor, an inner conductor disposed within said outer conductor, a hollow conductor sleeve carried on said inner conductor, said hollow conductor sleeve being a half wavelength long at the operating frequency of the transmitted electromagnetic energy, and wholly conductive disc means supporting said inner conductor within said outer conductor, said conductive disc means being positioned at the center of said hollow conductor sleeve and being entirely within said outer conductor, and having a resonant slot therein.

20. Apparatus for transmitting high frequency energy comprising an outer conductor, an inner conductor disposed within said outer conductor, a hollow conductor sleeve carried on said inner conductor, and a resonant bead extending between said sleeve and said outer conductor and supporting said inner conductor within said outer conductor, said bead having a resonant slot and being positioned at the center of said hollow conductor sleeve, whereby said bead is resonant at the operating frequency of electromagnetic energy being transmitted through said conductor.

21. Apparatus for transmitting high frequency energy comprising an outer conductor, an inner conductor disposed within said outer conductor, a hollow conductor sleeve carried on said inner conductor, said sleeve being a half wave length long at the operating frequency of the electromagnetic energy being transmitted, conductive means supporting said inner conductor within said outer conductor, said conductive means being positioned at the center of said hollow conductor sleeve and having an elongated slot resonant at the operating frequency of the electromagnetic energy being transmitted.

22. Apparatus for transmitting high frequency energy comprising an outer conductor, an inner conductor disposed within said outer conductor, said inner conductor having a conductive sleeve a half wave length long at the operating frequency fitted thereon and extending therealong, conductive disc means supporting said inner conductor within said outer conductor, said supporting means being entirely contained within said outer conductor and being placed at the center of said conductive sleeve and having a slot therein resonant to the frequency of electromagnetic energy being transmitted.

23. A high frequency apparatus for electromagnetic energy comprising an outer conductor, an inner conductor disposed within said outer conductor, and a conductive support arranged between said conductors supporting said inner conductor within said outer conductor, said conductive support having a central bore accommodating said inner conductor and also having a labyrinthine resonant slot disposed about said bore, said labyrinthine resonant slot defining a central slot section having termini slot sections parallel thereto and concentric therewith, said termini slot sections being connected to said central slot section by transverse slot sections, the configuration of said labyrinthine slot providing a filtering of said electromagnetic energy.

24. A high frequency apparatus comprising an outer conductor, an inner conductor disposed within said outer conductor, a conductive support arranged between said conductors supporting said inner conductor within said outer conductor, said conductive support having a central bore accommodating said inner conductor and also having a labyrinthine resonant slot defining several inter-joining slots disposed about said bore, said labyrinthine slot being resonant at two predetermined frequencies.

25. A high frequency filter apparatus comprising an outer conductor, an inner conductor disposed within said outer conductor, a conductive filter support arranged between said conductors supporting said inner conductor within said outer conductor, said conductive support having a central bore accommodating said inner conductor and also having a plurality of labyrinthine resonant slots disposed about said bore, each of said labyrinthine resonant slots being a mirror image of the other labyrinthine slots.

26. A high frequency filter apparatus comprising an outer conductor, an inner conductor disposed within said outer conductor, a conductive support arranged between said conductors supporting said inner conductor within said outer conductor, said conductor support constituting a filter and having a central bore accommodating said inner conductor and also having a plurality of labyrinthine slots disposed about said bore, the portion of said support bounded by said labyrinthine slots and said central bore of said support, providing a part of the inductance of said filter.

27. An impedance network for use in a concentric high frequency transmission line having an outer hollow conductor and an inner conductor coaxially disposed and supported therein, comprising a plurality of supports supporting said inner conductor within said outer conductor, each of said supports having a resonant slot cut therethrough, said slots having a dimension corresponding to a predetermined frequency of operation whereby said supports form frequency-sensitive impedance elements.

28. A transmission line for operation at a predetermined wave length comprising, a first conductor, a second conductor surrounding said first conductor and having a maximum spacing with reference thereto substantially less than one-quarter of said wave length, and a spacer for said conductors including a third conductor in mechanical and electrical engagement with said first and second conductors, disposed in the space therebetween, and having an effective electrical length substantially equal to an odd integral multiple of one-quarter of said wave length to present a maximum impedance across said line.

29. A transmission line for operation at a predetermined wave length comprising, a first conductor, a second conductor surrounding said first conductor and having a maximum spacing with reference thereto substantially less than one-quarter of said wave length, and a spacer for said conductors including a third conductor in mechanical and electrical engagement with said first and second conductors, disposed in the space therebetween, and having an effective electrical length substantially equal to one-quarter of said wave length to present a maximum impedance across said line.

30. A transmission line for operation at a predetermined wave length comprising, a first conductor, a second conductor parallel to and surrounding said first conductor and having a maximum spacing with reference thereto substantially less than one-quarter of said wave length, and a spacer for said conductors including a third conductor in mechanical and electrical engagement with said first and second conductors, disposed in the space therebetween, and having an effective electrical length substantially equal to an odd integral multiple of one-quarter of said wave length to present a maximum impedance across said line.

31. A coaxial transmission line for operation at a predetermined wave length comprising, a first conductor, a coaxially aligned second conductor surrounding said first conductor and having a maximum spacing with reference thereto substantially less than one-quarter of said wave length, and a spacer for said conductors including a third conductor in mechanical and electrical engagement with said first and second conductors, disposed in the space therebetween, and having an effective electrical length substantially equal to an odd integral multiple of one-quarter of said wave length to present a maximum impedance across said line.

32. A coaxial transmission line for operation at a predetermined wave length comprising, a first conductor of uniform cross section, a coaxially aligned second conductor of uniform cross section surrounding said first conductor and having a maximum spacing with reference thereto substantially less than one-quarter of said wave length, and a spacer for said conductors including a third conductor in mechanical and electrical engagement with said first and second conductors, disposed in the space therebetween, and having an effective electrical length substantially equal to an odd integral multiple of one-quarter of said wave length to present a maximum impedance across said line.

33. A transmission line for operation at a predetermined wave length comprising, a first conductor, a second conductor surrounding said first conductor and having a maximum spacing with reference thereto substantially less than one-quarter of said wave length, and a spacer for said conductors including a third conductor of spiral configuration in mechanical and electrical engagement with said first and second conductors, disposed in the space therebetween, and having an effective electrical length substantially equal to an odd integral multiple of one-quarter of said wave length to present a maximum impedance across said line.

34. A transmission line for operation at a predetermined wave length comprising, a first conductor, a second conductor surrounding said first conductor and having a maximum spacing with reference thereto substantially less than one-quarter of said wave length, and a spacer for said conductors including a third conductor of spiral configuration disposed in the space between said first and second conductors, mechanically and electrically connected to corresponding portions thereof and having an effective electrical length substantially equal to an odd integral multiple of one-quarter of said wave length to present a maximum impedance across said line.

35. A transmission line for operation over a predetermined range of wave lengths comprising, a first conductor, a second conductor surrounding said first conductor and having a maximum spacing with reference thereto substantially less than one-quarter of the mean wave length of said range, and a plurality of spacers for said conductors having a spacing therealong approximately equal to an odd integral multiple of one-quarter of said mean wave length and individually including a third conductor in mechanical and electrical engagement with said first and second conductors, disposed in the space therebetween, and having an effective electrical length substantially equal to an odd integral multiple of one-quarter of said mean wave length to present a maximum impedance across said line.

36. A transmission line for operation over a predetermined range of wave lengths comprising, a first conductor, a second conductor surrounding said first conductor and having a maximum spacing with reference thereto substantially less than one-quarter of the mean wave length of said range, and a plurality of spacers for said conductors having a spacing therealong approximately equal to one-quarter of said mean wave length and individually including a third conductor in mechanical and electrical engagement with said first and second conductors, disposed in the space therebetween, and having an effective electrical length substantially equal to one-quarter of said mean wave length.

37. A high frequency apparatus comprising an outer conductor, an inner conductor disposed within the outer conductor, a conductive resonant support member between the conductors for supporting the inner conductor co-axially within the outer conductor, said resonant support member having an arcuate resonant slot concentrically disposed relative to the inner conductor and having a pair of end regions equally spaced from the inner conductor.

38. The apparatus defined in claim 37 wherein the resonant slot is of a predetermined width and the end regions are of a width substantially equal to said predetermined width.

39. The apparatus defined in claim 37 wherein the end regions are each formed as substantially circular apertures.

40. The apparatus defined in claim 37 wherein the end regions are disposed on diametrically opposite sides of the inner conductor.

EDWIN T. JAYNES.

REFERENCES CITED

The following references are of record in the file of this patent:

UNITED STATES PATENTS

| Number | Name | Date |
|---|---|---|
| 1,859,390 | Green | May 24, 1932 |
| 2,109,843 | Kassner | Mar. 1, 1938 |
| 2,117,758 | Douglas | May 17, 1938 |
| 2,342,254 | Dallenbach | Feb. 22, 1944 |
| 2,376,725 | Richardson et al. | May 22, 1945 |
| 2,408,745 | Espley | Oct. 8, 1946 |
| 2,409,617 | Elliot et al. | Oct. 22, 1946 |
| 2,410,656 | Herold | Nov. 5, 1946 |
| 2,435,618 | Young | Feb. 10, 1948 |
| 2,446,982 | Pound | Aug. 10, 1948 |